United States Patent [19]

Ambrosius, III et al.

[11] Patent Number: 4,543,646

[45] Date of Patent: * Sep. 24, 1985

[54] CHIP TOPOGRAPHY FOR MOS DATA ENCRYPTION STANDARD CIRCUIT

[75] Inventors: William H. Ambrosius, III, Mission Viejo; Larry D. Rossean, Santa Ana, both of Calif.

[73] Assignee: Western Digital Corporation, Newport Beach, Calif.

[*] Notice: The portion of the term of this patent subsequent to Sep. 24, 2000 has been disclaimed.

[21] Appl. No.: 156,594

[22] Filed: Jun. 5, 1980

[51] Int. Cl.⁴ ............................................. G06F 1/00
[52] U.S. Cl. ................................ 364/900; 178/22.09
[58] Field of Search ............................ 364/200, 900; 178/22.05, 22.06, 22.07, 22.09

[56] References Cited

U.S. PATENT DOCUMENTS

| 3,958,081 | 5/1976 | Ehrsam | 178/22.07 |
| 3,968,478 | 7/1976 | Mensch | 364/200 |
| 3,987,418 | 10/1976 | Buchanan | 364/200 |
| 4,144,561 | 3/1979 | Tu | 364/200 |
| 4,393,464 | 7/1983 | Knapp et al. | 364/200 X |
| 4,433,378 | 2/1984 | Leger | 364/200 |

OTHER PUBLICATIONS

"Data Security Chip", Finger et al., *IBM Technical Disclosure Bulletin*, vol. 20, No. 9 (Feb. 1978), pp. 3543-3544.

*Primary Examiner*—Thomas M. Heckler
*Attorney, Agent, or Firm*—Spensley Horn Jubas & Lubitz

[57] ABSTRACT

An optimum chip topography for a MOS LSI Data Encryption Standard (DES) circuit, including interface and input/output circuitry disposed around the periphery of the chip, control circuitry disposed in a substantially rectangular area across the upper one-third of the surface of the chip, and, disposed on approximately the lower two-thirds of the surface of the chip and perpendicular to the control circuitry area, and arranged from one side of the chip to the other side of the chip, a key register, permuted choice circuitry, a first combinatorial circuit, a right data register, a second combinatorial circuit, a left data register, a P-combinatorial circuit, a first programmable logic arry group, and a second programmable logic array group. The bonding pad sequence for the MOS DES circuit chip is selected to allow the chip to be placed in either a 40-pin dual-in-line package or a 28-pin dual-in-line package. The bonding pad sequence for the MOS DES circuit chip is also selected to allow optimum arrangement of packages containing the DES circuit chips on a printed circuit board. Repetitive circuit cells and custom drawn circuit cells are both utilized so as to optimize use of semiconductor chip area.

7 Claims, 11 Drawing Figures

CHIP TOPOGRAPHY FOR MOS DATA ENCRYPTION STANDARD CIRCUIT

BACKGROUND OF THE INVENTION

A primary consideration in the economical manufacture of metal oxide semiconductor (MOS) large scale integrated (LSI) circuits is minimizing the amount of substrate material, such as silicon, required to produce the integrated circuit chips, thus allowing a greater chip yield per substrate wafer. The surface geometry of the MOS devices formed on the chips and the interconnection pattern of conductors therebetween must be optimized to provide the highest functional component density in order to reduce overall chip area per circuit function. Minimum geometry spacings between metalization lines, diffused regions and polycrystalline silicon conductors must be maintained, yet the length of such lines and their associated capacitance must be minimized in order to optimize circuit performance as the complex interconnection patterns are implemented. Parasitic electrical effects on the circuitry also must be minimized or compensated for in the chip layout. A very high degree of creativeness is thus required of the chip architect in order to choose a particular layout and interconnection pattern for an LSI circuit from the very large number of possibilities that exist for arranging such a circuit. Frequently, the commercial success for a MOS LSI product may hinge on the ability of the chip architect to achieve an optimum chip topography.

The present invention is a MOS LSI Data Encryption Standard (DES) chip having an optimum chip topography and designed to encrypt and decrypt 64-bit blocks of data using the algorithm specified in Federal Information Processing Standards Publication No. 46. The MOS DES chip is designed to be incorporated in electronic communications circuitry, for use in such applications as secure brokerage transactions, electronic funds transfers, secure banking and business accounting computer mainframe communications, remote and host computer communications, secure data storage, and secure packet switching transmissions. By creatively structuring the topographic layout of the DES circuitry, the present invention allows a MOS chip size of 197 mils by 219 mils, with a processing speed of approximately 1.95 megabits per second. The DES circuit in operation encrypts a 64-bit clear text word using a 56-bit user-specified keyword to produce a 64-bit cipher text word. When the present invention is reversed under user control, a 64-bit cipher text word is decrypted to produce the original 64-bit clear text word. The preferred embodiment of the present invention is fabricated in N-channel, self-aligned silicon gate MOS technology and is compatible on all inputs and outputs with transistor-transistor logic.

SUMMARY OF THE INVENTION

It is an object of this invention to provide an optimum semiconductor chip topography for a MOS LSI chip implementation of the algorithm specified in Federal Information Processing Standards Publication No. 46.

It is another object of this invention to provide an optimum chip topography for a MOS LSI Data Encryption Standard (DES) circuit, including interface and input/output circuitry disposed around the periphery of said chip, control circuitry disposed in a substantially rectangular area across approximately the upper one-third of the surface of said chip, and, disposed on approximately the lower two-thirds of the surface of said chip and perpendicular to the control circuitry area, starting at the right side of the chip and extending to the left side of the chip, a key register, permuted choice circuitry, a first combinatorial circuit, a right data register, a second combinatorial circuit, a left data register, a p-combinatorial circuit, and two programmable logic array groups.

It is yet another object of this invention to provide a bonding pad sequence for a MOS DES circuit chip selected to allow the chip to be placed in either a 40-pin dual-in-line package or a 28-pin dual-in-line package.

It is a further object of this invention to provide a bonding pad sequence for a MOS DES circuit chip selected to allow optimum arrangement of packages containing the DES chips on a printed circuit board.

BRIEF DESCRIPTION OF THE DRAWINGS

Like numbers in the different figures refer to like parts.

DESCRIPTION OF THE INVENTION

Figure 8:
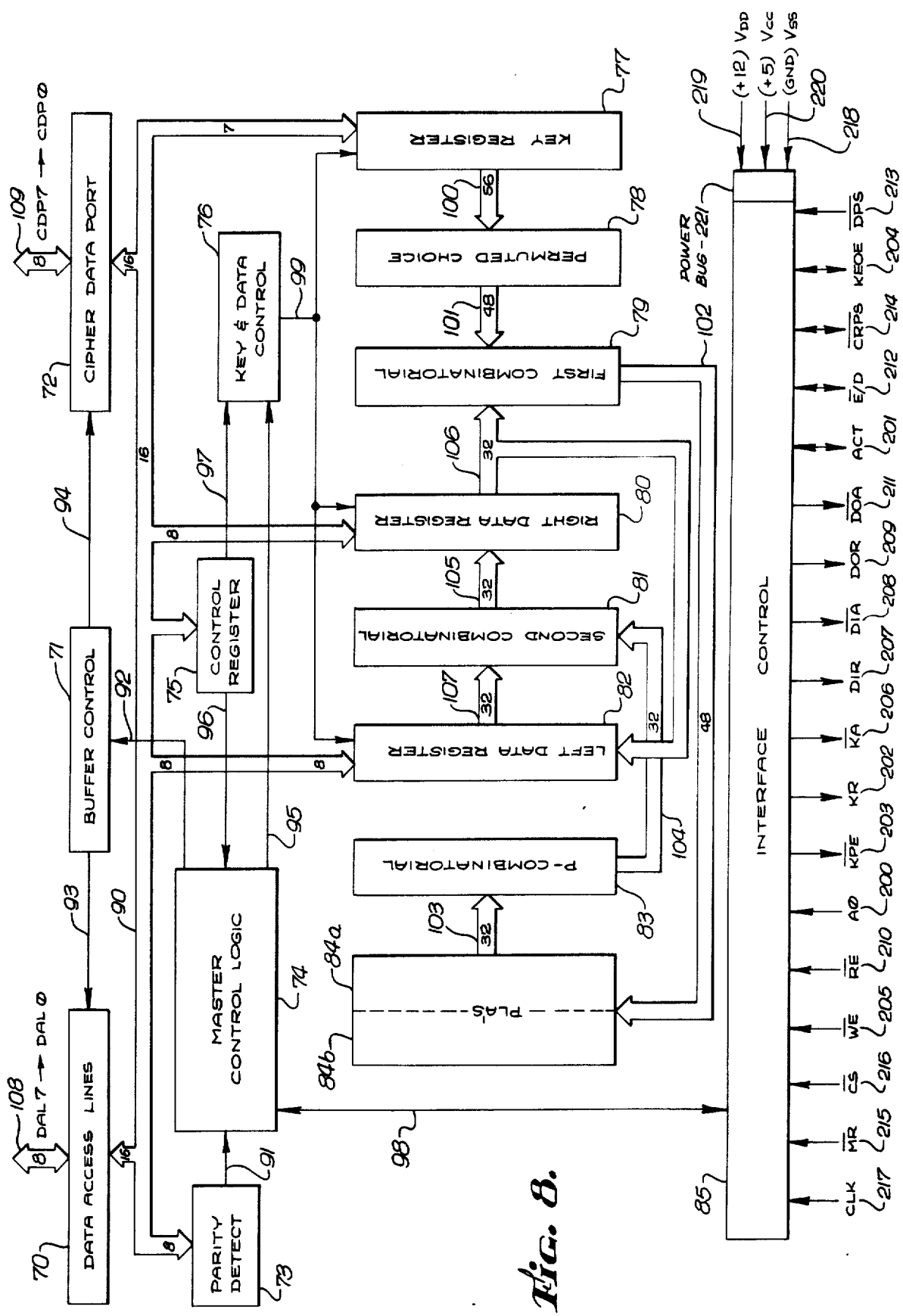
FIG. 8 is a block diagram of a DES circuit according to the invention and includes the circuit architecture described by the MOS chip topography illustrated in FIGS. 1 through 7.

Referring to FIG. 8, there is shown a block diagram of a preferred embodiment of a Data Encryption Standard circuit implementing the algorithm specified in Federal Information Processing Standards Publication No. 46. The DES circuit includes data access lines 70, buffer control circuitry 71, a cipher data port 72, parity detect circuitry 73, master control logic circuitry 74, an 8-bit control register 75, key and data control circuitry 76, a key register 77, permuted choice circuitry 78, a first combinatorial circuit 79, a right data register 80, a second combinatorial circuit 81, a left data register 82, a P-combinatorial circuit 83, first and second programmable logic array groups 84a, 84b, and interface control circuitry 85.

Connections between these sub-circuits are made by means of data buses comprised of separate conductors. The data buses themselves vary in width from 1 separate conductor to 56 separate conductors. Because of the great number of conductors required in implementing the data encryption algorithm, particular care must be taken in laying out the MOS LSI circuitry comprising the present invention.

In FIG. 8, a sixteen-bit wide input/output bus 90 interconnects the control circuitry and the input/output circuitry of the DES circuit. The data access lines 70 and the cipher data port 72 connect to all of the sixteen lines of the input/output bus 90. The parity detect circuitry 73, the control register 75, the right data register 80, and the left data register 82 each connect to a certain eight, and the key register 77 connects to a certain seven, of the sixteen lines of the input/output bus 90.

The data access lines 70 and the cipher data port 72 include input and output signal conditioning circuitry adapted to allow the DES circuit to communicate with external circuitry in a bi-directional manner over the eight-bit wide DAL input/output bus 108 and the eight-bit wide CDP input/output bus 109, respectively.

The parity detect circuitry 73 is coupled to the master control logic circuitry 74 by a parity detect signal bus 91. The master control logic circuitry 74 is connected by a buffer control signal bus 92 to the buffer control circuitry 71, which in turn regulates the input and output of the data access lines 70 and the cipher data port 72 by a buffer data access control bus 93 and a buffer cipher data control bus 94, respectively, under the control of the master control logic circuitry 74. The master control logic circuitry 74 also regulates the key and data control circuitry 76 by a master key and data control signal bus 95. The control register 75 is connected to and regulated by the master control logic circuitry 74 through a control register master control signal bus 96, and is connected to the key and data control circuitry 76 by a control register key and data signal bus 97.

The interface control circuitry 85 is adapted to couple external circuitry to the input and output pins of the DES chip, other than to the pins of the DAL input/output bus 108 and the CDP input/output bus 109. The interface control circuitry 85 communicates with the master control logic circuitry 74 by means of an interface control bus 98.

The key and data control circuitry 76, under the control of the master control logic circuitry 74 and the control register 75, regulates the loading of the keyword and of the data into the actual encryption circuitry by means of a key and data control bus 99, which is connected to the key register 77, the right data register 80, and the left data register 82.

The key register 77 is coupled to the permuted choice circuitry 78 by a key register bus 100 that is fifty-six bits wide. The permuted choice circuitry 78 in turn is coupled to the first combinatorial circuit 79 by a permuted choice bus 101 that is forty-eight bits wide.

The first combinatorial circuit 79 is coupled to the first and second programmable logic array groups 84a, 84b by a first combinatorial bus 102 that is forty-eight bits wide. Each programmable logic array group 84a, 84b is composed of four distinct programmable logic arrays, each having six separate inputs from the first combinatorial bus 102. In the present embodiment, two programmable logic array groups are employed to facilitate inter-array connections. However, other groupings of the eight programmable logic arrays may also be used in the DES circuit. The two programmable logic array groups 84a, 84b are interconnected with each other, and are coupled by an array bus 103 that is thirty-two bits wide to the P-combinatorial circuit 83, which in turn is coupled by a P-combinatorial bus 104 that is thirty-two bits wide to the second combinatorial circuit 81.

The second combinatorial circuit 81 is coupled to the right data register 80 by a thirty-two bit wide second combinatorial bus 105. The right data register 80 is coupled to the first combinatorial circuit 79 and to the left data register 82 by a right cata register bus 106 that is thirty-two bits wide. the left data register 82 is connected to the second combinatorial circuit 81 by a thirty-two bit wide left data register bus 107.

In operation, the user programs the DES circuit for encryption or decryption, and single or dual port operation. This latter option allows all keyword, command/status, and clear and cipher input and output text to be transmitted through the data access lines 70 alone, or to allow the data access lines 70 to transmit or receive only clear text, keyword data, and command/status information, and the cipher data port 72 to transmit or receive only cipher text, according to the system needs of the user.

Data is encrypted or decrypted with a 64-bit user defined keyword. Data encrypted with a given keyword can be decrypted using only that same keyword.

Operation of the DES circuit is initiated by applying a binary "1" to the A0 input pin 200, which causes the DES circuit to internally address the eight-bit control register 75. The user then provides one eight-bit byte of command information to the data access lines 70 and activates the $\overline{\text{Write Enable}}$ ($\overline{\text{WE}}$) input pin 205 to signal the DES circuit that the command byte is available for storage in the control register 75. Only the second through fourth bits of the command byte affect the control register 75. To activate the DES circuit, the user loads a binary "1" into the second, or Activate, bit position of the control register 75. The status of the Activate bit can be checked at any time by the user through the Activate (ACT) pin 201, which is a read-only output line of the DES circuit when the operation of the circuit is being initiated by using the A0 pin 200 and the data access lines 70 to program the control register 75.

After setting the Activate bit, the user then deactivates the A0 input pin 200. One clock period after setting the Activate bit, the DES circuit will respond by internally addressing the key register 77, setting the fifth, or Key Request, bit of the control register 75 to a binary "1", and activating the Key Request (KR) 202 output signal. The user then must load the key register 77 with the user selected 64-bit keyword in eight consecutive bytes. As each byte of the keyword is transmitted to the DES circuit through the data access lines 70, the byte is checked for odd parity. If a parity error is found, the DES circuit will set the sixth, or Key Parity Error (KPE), bit of the control register 75 to a binary "1". If the user had initially set the third, or Key Error Output Enable (KEOE), bit of the control register 75 to a binary "1", the $\overline{\text{Key Parity Error}}$ ($\overline{\text{KPE}}$) output pin 203 will signal a parity error when the KPE bit is set to a binary "1" by the DES circuit. If instead the KEOE bit is initially set to a binary "0", parity detect errors will not be signaled to the user. The status of the KEOE bit can be read through the KEOE pin 204 by the user.

The KPE bit of the control register 75 is a read-only bit, and will be reset when the Activate bit of the control register 75 is reprogrammed to a binary "0" by means of the A0 pin 200 and a new user supplied command byte. Although sixty-four bits of key-word are provided to the DES circuit in the above fashion only fifty-six bits are stored in the key register 77, the remaining eight bits having been provided merely for parity detection, one bit at a time, for each of the eight keyword bytes.

To begin loading the keyword, the user provides the first byte of the keyword to the data access lines 70 of the DES circuit and activates the $\overline{\text{Write Enable}}$ ($\overline{\text{WE}}$) input pin 205 to signal the DES circuit that data has been provided to the circuit. To fully load the key register 77 with the entire keyword, the $\overline{\text{WE}}$ pin 205 must be activated eight successive times. When the $\overline{\text{WE}}$ pin 205 is made active, the DES circuit deactivates the Key Request (KR) output pin 202. When the $\overline{\text{WE}}$ pin 205 is deactivated, the KR output 202 is again activated. The DES circuit will automatically activate eight Key Requests through the KR output 202 in this fashion until the key register 77 is full, and then reset to a binary "0" the Key Request bit of the control register 75.

Whenever the $\overline{\text{WE}}$ pin 205 is made active, the DES circuit responds by activating the $\overline{\text{Key Acknowledge}}$ ($\overline{\text{KA}}$) pin 206, thus allowing for asynchronous handshaking communication, as in direct memory access control.

After loading the eighth byte of the keyword into the key register 77, the DES circuit will set the seventh, or Data-In Request (DIR), bit of the control register 75 to a binary "1", activate the DIR output line 207, and cause the DES circuit to address the two thirty-two bit wide data registers 80, 82. The 64-bit data word to be encrypted or decrypted must then be loaded into the data registers 80, 82, which is done in a manner similar to the loading of the keyword into the key register 77. That is, the DES circuit activates the DIR output 207 after the keyword is fully loaded into the key register 77, and the user then provides one byte of a 64-bit data word to the data access lines 70 and activates the $\overline{\text{Write Enable}}$ ($\overline{\text{WE}}$) pin 205 to signal the DES circuit that input data is available. The DIR output 207 is similar to the Key Request (KR) output 202, in that the DES circuit automatically activates eight Data-In Requests until the two data registers 80, 82 are full. The $\overline{\text{Datan/ Acknowl edge}}$ ($\overline{\text{DIA}}$) output signal line 208 is similar to the $\overline{\text{Key Acknowledge}}$ ($\overline{\text{KA}}$) output 206, being active whenever the $\overline{\text{WE}}$ signal 205 is active and the data registers 80, 82 are being loaded.

After the eighth byte of the data word has been loaded, half into the right data register 80 and half into the left data register 82, the DES circuit resets the DIR bit of the control register 75 to binary "0" and begins the internal calculation of the algorithm specified in Federal Information Processing Standards Publication No. 46. The algorithm is performed by the combined action of the key register 77, the permuted choice circuitry 78, the first combinatorial circuit 79, the right data register 80, the second combinatorial circuit 81, the left data register 82, the P-combinatorial circuit 83, and the two programmable logic array groups 84a, 84b.

Upon completion of the algorithm calculation, the transformed data is internally stored in the left and right data registers 80, 82. The DES circuit then sets the eighth, or Data-Out Request (DOR), bit of the control register 75 to a binary "1" and activates the DOR output line 209, thereby signalling the user that the calculation has been completed. The data word may then be read from the data registers 80, 82 in a manner which is essentially the reverse of the data register loading process. That is, the DES circuit activates the DOR output 209 when the first byte of the sixty-four bits of transformed data is ready to be transmitted. The user then activates the $\overline{\text{Read Enable}}$ ($\overline{\text{RE}}$) input pin 210, and reads the eight bits made available from the left and right data registers 80, 82 through the data access lines 70. The user activates the $\overline{\text{RE}}$ input 210 eight successive times to read the entire sixty-four bits of transformed data. Each time the user activates the $\overline{\text{RE}}$ input 210 to the DES circuit the DES circuit responds with a $\overline{\text{Dataut/ Ac knowledge}}$ ($\overline{\text{DOA}}$) signal 211 which may be used for asynchronous handshaking communication. The DOR output 209 is similar to the KR output 202 and the DIR output 207, in that the DES circuit automatically activates eight Data-Out Requests until the two data registers 80, 82 have been read out.

After the first Data-In Request (DIR) 207 or Data-Out Request (DOR) 209 output signal, further activations of the DIR signal 207 or DOR signal 209, and all of the activations of the $\overline{\text{Datan/ Acknowledge}}$ ($\overline{\text{DIA}}$) signal 208 and $\overline{\text{Dataut/ Acknowledge}}$ ($\overline{\text{DOA}}$) signal 211, can be ignored and the data registers loaded or read, respectively, by eight successive activations by the user of the $\overline{\text{Write Enable}}$ ($\overline{\text{WE}}$) signal line 205 205 or the $\overline{\text{Read Enable}}$ ($\overline{\text{RE}}$) signal line 210, respectively. The ability to disregard these signals without affecting the operation of the DES circuit allows the DES circuit to be used with synchronous or programmed input/output communications circuitry.

After the eighth byte of the data register has been read out, the DES circuit will automatically reset the Data-In Request (DIR) bit of the control register 75 to a binary "1" and activate the DIR signal 207, while resetting the DOR bit of the control register 75 to a binary "0". The cycle of loading the data registers, performing the internal algorithm calculation, and reading out the transformed data from the data registers can continue indefinitely until all desired data has been encrypted or decrypted with the current, user defined keyword.

After all desired data has been encrypted or decrypted with the current keyword, the Activate bit of the control register 75 should be set to a binary "0" by activating the A0 input 200 and loading an appropriate command byte into the control register 75.

When the Activate bit has been reset to zero, an unauthorized user will not have access to the last keyword loaded into the DES circuit, since to resume operation the Activate bit must be programmed to a binary "1", automatically activating the Key Request (KR) signal line 202 requiring that a new keyword be loaded into the key register 77 before access to the data registers is possible. It is therefore impossible to read out the last keyword stored in the key register 77.

To encrypt clear data into cipher data, the fourth, or Encrypt/Decrypt ($\overline{E/D}$), bit of the control register 75 must have previously been programmed to a binary "0" by means of the A0 input 200 and an appropriate command byte. The status of the bit can be read through the $\overline{E/D}$ pin 212. Clear data is then loaded through the data access lines 70 into the data registers 80, 82, as described above, and encrypted data is read out from the data registers back through the data access lines 70.

To decrypt encrypted data, the $\overline{E/D}$ bit of the control register 75 must have been previously programmed to a binary "1". Encrypted data is then loaded into the data registers 80, 82 through the data access lines 70, and clear data is read out from the data registers 80, 82 back through the data access lines 70.

If it is desired to switch from the encryption to the decryption mode (or vice-versa) using the same keyword, the user can activate the A0 input before a data word transfer is initiated. The DES circuit will override the internal addressing of the data registers 80, 82 and address the control register 75, which can then be reprogrammed to the desired mode without changing the Activate bit. When the A0 200 input is returned to a low state, the DES circuit will internally enable the data registers 80, 82 to accept a next data word without requiring a new keyword.

Figure 10:
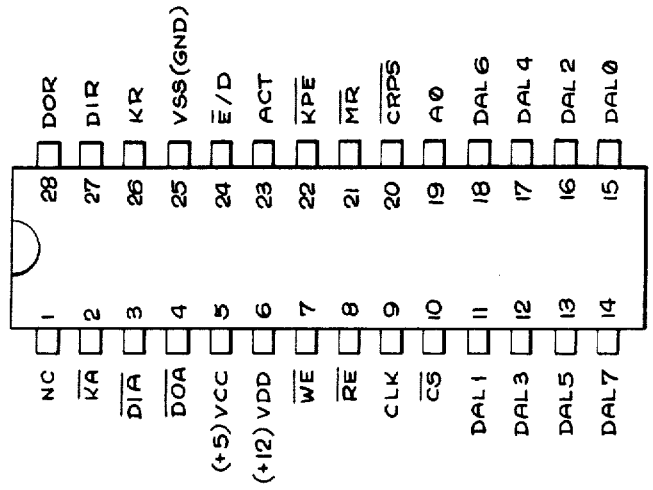
FIG. 10 is a drawing designating the external lead connections of a 28-pin dual-in-line package housing the DES chip diagrammed in FIG. 8.
Figure 9:
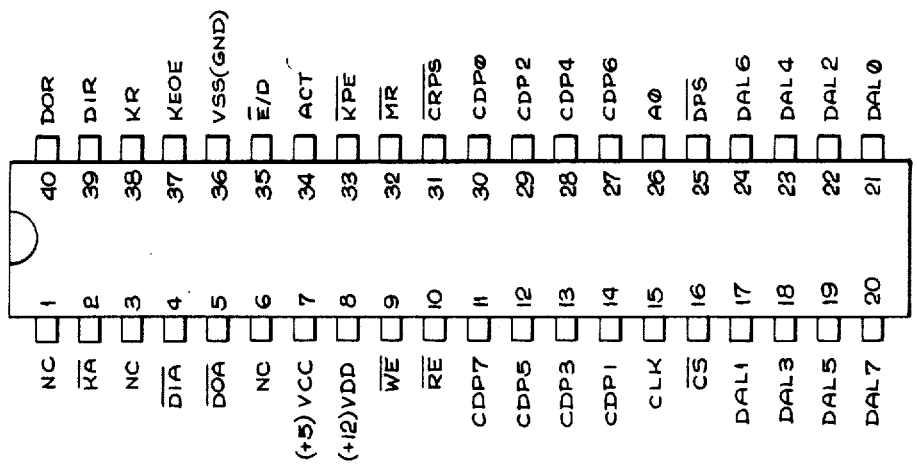
FIG. 9 is a drawing designating the external lead connections of a 40-pin dual-in-line package housing the DES chip diagrammed in FIG. 8.

The present invention is available in two chip packages. FIG. 9 shows a 40-pin dual-in-line package housing the MOS DES chip diagrammed in FIG. 8. FIG. 10 discloses an alternative 28-pin dual-in-line package housing the MOS DES chip diagrammed in FIG. 8. The DES chip inside the 28-pin package is identical to the DES chip inside the 40-pin package. The 28-pin package, however, lacks the eight input/output pins of the cipher data port 72, the Key Error Output Enable input/output pin 204, and the $\overline{\text{Dual Port Select}}$ ($\overline{\text{DPS}}$) 213 input pin.

In the 28-pin configuration, all input and output of data, command, and keyword information is through the data access lines 70. In the 40-pin version, all input and output similarly can be performed through the data access lines 70, or alternatively, the $\overline{\text{Dual Port Select}}$ input pin 213 may be utilized to activate the cipher data port 72. In the dual port mode, all information transfers to the key register 77 and the control register 75 are still performed over the data access lines 70. Clear text data words are also transferred to the data registers 80, 82 through the data access lines 70. However, selecting the dual port mode causes the buffer control circuitry 71 to route cipher text data into and out of the DES chip through the cipher data port 72. Encryption during dual port operation requires loading clear text by means of the data access lines 70, and reading cipher text out through the cipher data port 72. Decryption during dual port operation requires loading cipher data in through the cipher data port 72, and reading clear text out through the data access lines 70. The dual port mode in the 40-pin package therefore provides separate input/output busses for clear and cipher text.

Another option available to the user is the $\overline{\text{Command Register Pin Select}}$ ($\overline{\text{CRPS}}$) input pin 214. When the $\overline{\text{CRPS}}$ input 214 is activated, input A0 200 will be disregarded, and the control register 75 cannot be accessed through the data access lines 70. Instead, the individual bits of the control register 75 are controlled by means of individual pins. This optional mode of operation therefore allows complete hardware control of the DES circuit functions previously described in exactly the same manner as under programmed control. Thus, the second, or Activate, bit of the control register 75 is controlled by the Activate pin 201, the third, or Key Error Output Enable ($\overline{\text{KEOE}}$), bit is controlled by the $\overline{\text{KEOE}}$ pin 204, and the fourth, or $\overline{\text{Encrypt/Decrypt}}$, bit is controlled by the $\overline{\text{E/D}}$ pin 212. It should be noted that during this mode of operation, the Activate (ACT) 200 pin must be toggled from a binary "1" to a binary "0" to clear a parity error detection. All other operation remains as previously described.

The DES circuit is also provided with a $\overline{\text{Master Reset}}$ ($\overline{\text{MR}}$) 215 input pin, which allows the user to reset all the bits of the control register 75 to binary "0", except the third, or Key Error Output Enable, bit, which is set to a binary "1".

A $\overline{\text{Chip Select}}$ ($\overline{\text{CS}}$) 216 pin is provided for the DES chip to control the three-state input/output busses 108, 109 of the data access lines 70 and cipher data port 72, thus allowing the DES chip to be conveniently used in bus oriented systems. The $\overline{\text{CS}}$ input 216 is made low to allow access to the registers within the DES circuit, and high to set the input/output busses 108, 209 of the data access lines 70 and the cipher data port 72 to a high-impedence state.

The remaining inputs to the DES circuit are a system clock (CLK) input 217, and through a power bus 221, a $V_{ss}$(GND) pin 218, a +12 volts DC power supply input $V_{dd}$ 219, and a +5 volts DC power supply input $V_{cc}$ 220.

Figure 1:
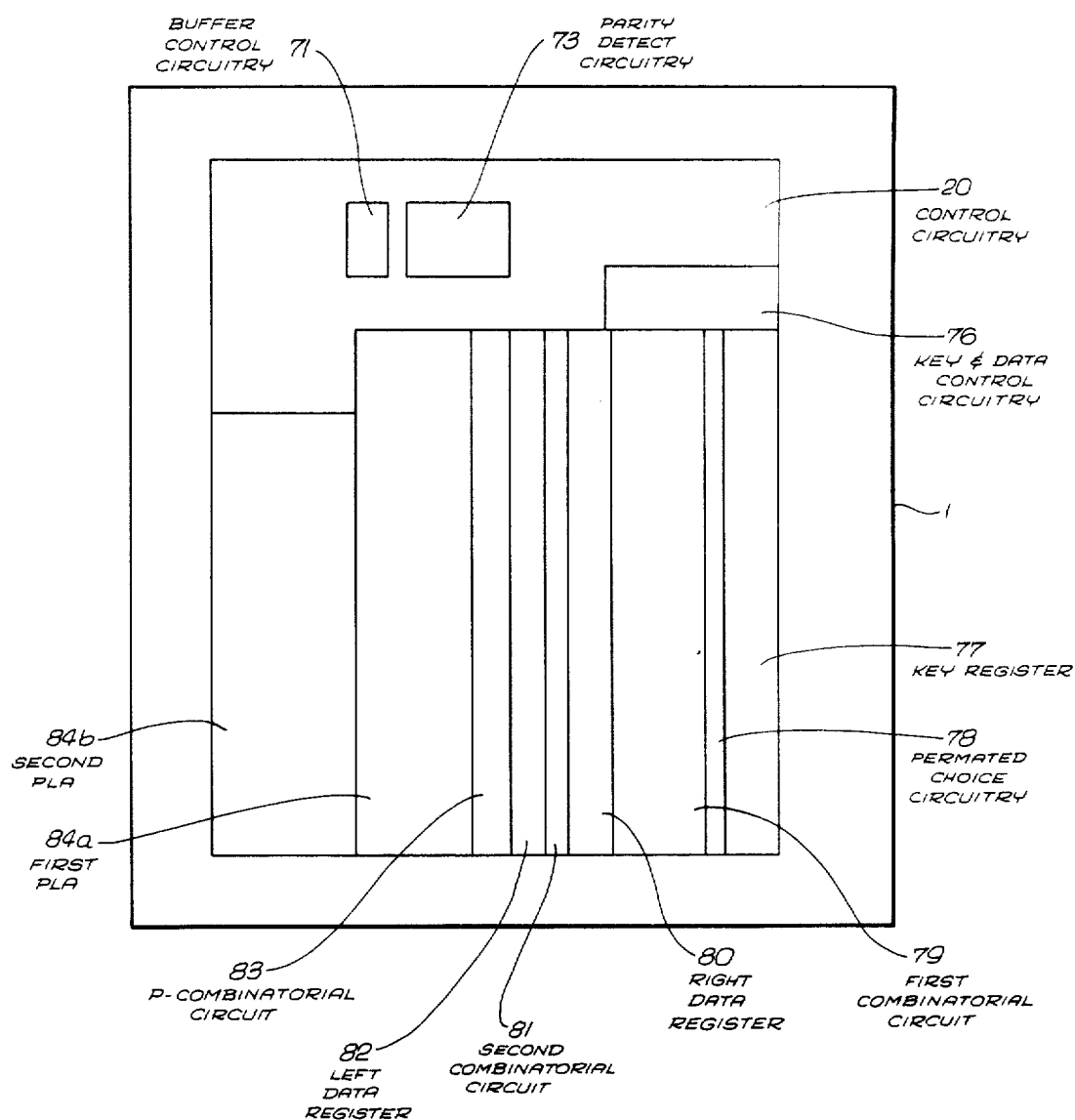
FIG. 1 is a block diagram illustrating the general location on a semiconductor chip of a DES circuit according to the invention.

FIG. 1 is a drawing outlining the topography of the Data Encryption Standard circuit MOS chip of the present invention, showing essentially all of the control circuitry 20 for the DES circuit generally disposed in a substantially rectangular area along the upper one-third the chip surface. Specifically identifiable subportions of the control circuitry 20 are the buffer control circuitry 71, the parity detect circuitry 73, and the key and data control circuit 76. Disposed across approximately the lower two-thirds of the DES chip surface and arranged vertically, from the right side to the left side of the chip, are the key register 77, the permuted choice circuitry 78, the first combinatorial circuit 79, the right data register 80, the second combinatorial circuit 81, the left data register 82, the P-combinatorial circuit 83, and the first and second programmable logic array groups 84a, 84b.

The control section 20 shown in FIG. 1 contains the circuitry diagrammed in FIG. 8 for the buffer control circuitry 71, the parity detect circuitry 73, the master control logic circuitry 74, the control register 75, the key and data control circuitry 76, and a portion of the interface control circuitry 85.

The periphery 31 of the chip is used for the bonding pads 32 necessary to couple the DES chip to an external package in conventional fashion, and for the circuitry comprising the data access lines 70, the cipher data port 72, and the remainder of the interface control circuitry 85. The input/output circuitry located around the periphery of the DES chip is necessary to make the output signals from the DES chip electrically compatible with external circuitry, and the input signals of external circuitry electrically compatible with the DES chip. The circuitry of the data access lines 70 and the cipher data port 72 further comprises multiplexing circuitry to provide for bi-directional communication over the same pins. The portion of the interface control circuitry 85 located at the periphery of the DES chip also has multiplexing circuitry to enable certain of the chip access pins to communicate in a bi-directional manner, for input and output signalling over the same pin.

Figure 7:
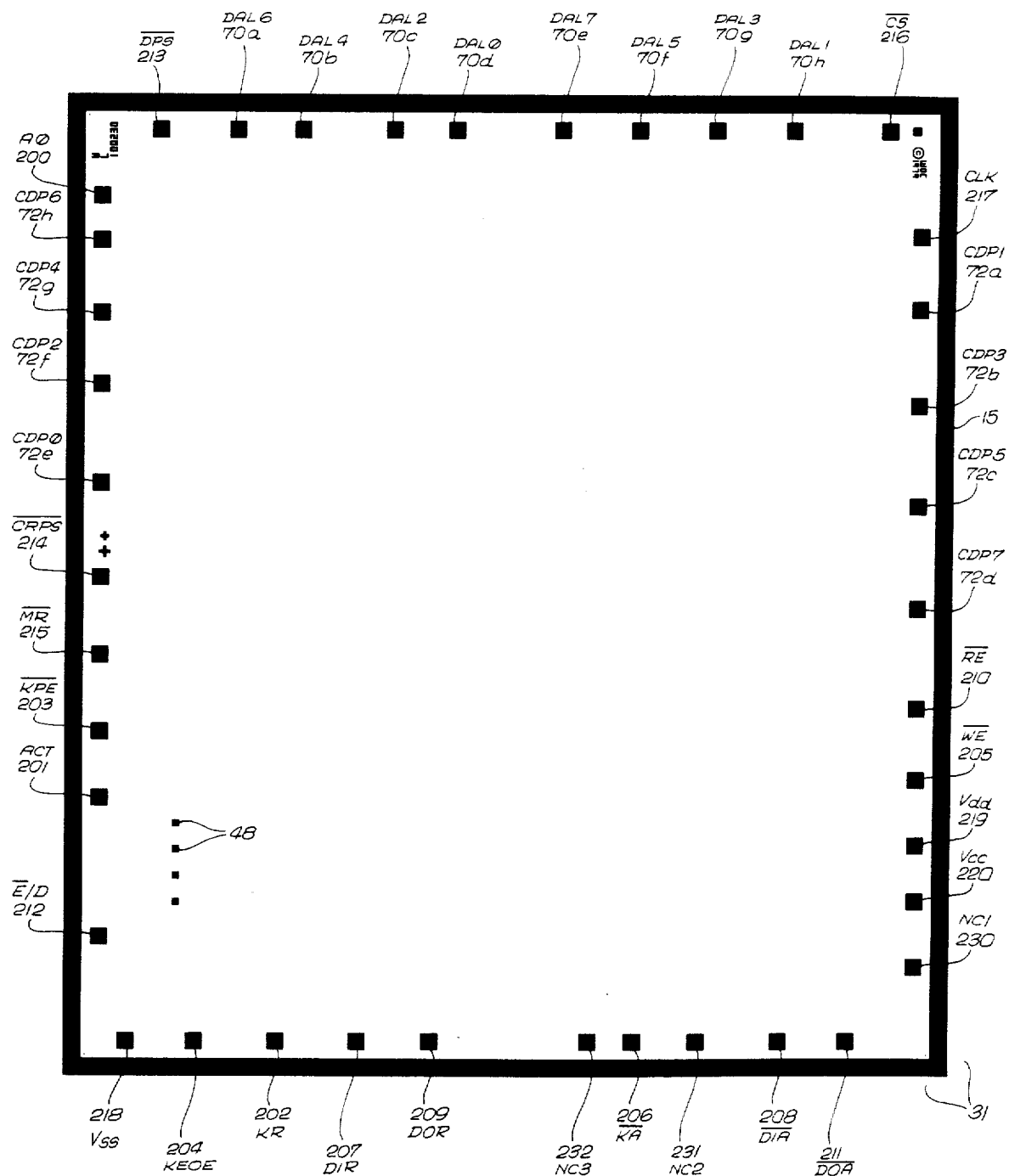
FIG. 7 is a scale drawing of a photomask used to define and isolate the bonding pads while the remainder of the chip is protectively coated during the manufacture of a MOS DES circuit according to the invention.

Referring now to FIG. 7, the bonding pads 32 for the DES chip are arranged around the periphery 31 of the chip in an order particularly well suited for housing the DES chip in either a 40-pin dual-in-line package or a 28-pin dual-in-line package, within the conventional requirements for bonding-lead lengths and angles. In the present embodiment, beginning with the upper righthand corner of FIG. 7 and proceeding clockwise, the bonding pad order of the DES chip is as follows: Clock (CLK) 217, Cipher Data Port-1 (CDP1) 72a, CDP3 72b, CDP5 72c, CDP7 72d, $\overline{RE}$ 210, $\overline{WE}$ 205, $V_{dd}$ 219, $V_{cc}$ 220, No Connection-1 (NC1) 230, $\overline{DOA}$ 211, $\overline{DIA}$ 208, NC2 231, $\overline{KA}$ 206, NC3 232, DOR 209, DIR 207, KR 202, KEOE 204, $V_{ss}$ (GND) 218, $\overline{E/D}$ 212, ACT 201, $\overline{KPE}$ 203, $\overline{MR}$ 215, $\overline{CRPS}$ 214, CDP0 72e, CDP2 72f, CDP4 72g, CDP6 72h, A0 200, $\overline{DPS}$ 213, Data Access Line-6 (DAL6) 70a, DAL4 70b, DAL6 70c, DAL0 70d, DAL7 70e, DAL5 70f, DAL3 70g, DAL1 70h, and $\overline{CS}$ 216.

FIG. 9 discloses a 40-pin dual-in-line package housing suitable for the DES chip. A preferred sequence of external pin assignments is also illustrated in FIG. 9. The sequence of the pins was chosen to provide maximum utility in placing the DES chip on an integrated circuit board. Although the present invention interfaces to a wide variety of processors, including minicomputers, the DES chip interface is particularly tailored to the basic bus structure and communications control scheme of the "8080A" class of microprocessors.

FIG. 10 shows an alternative 28-pin dual-in line package housing the DES chip, and a preferred sequence of external pin assignments. As noted above, the 28-pin package version does not have the eight pins of the cipher data port pin 72, the Key Error Output Enable pin 204, or the $\overline{Dual}$ $\overline{Port}$ Select pin 215 (as shown in FIG. 7). The DES chip mounted in the 28-pin package is thus identical to the DES chip mounted in the 40-pin package, the unused bonding pads of the DES chip being left unconnected to access pins in the 28-pin package.

Referring to FIGS. 9 and 10, it should be noted that the $V_{cc}$, $V_{dd}$, and $V_{ss}$ voltage supply pins are not symmetrically located on the package, so that if the package is inserted backwards into a printed circuit board and power is applied, damage to the DES chip may be avoided.

Figure 2:
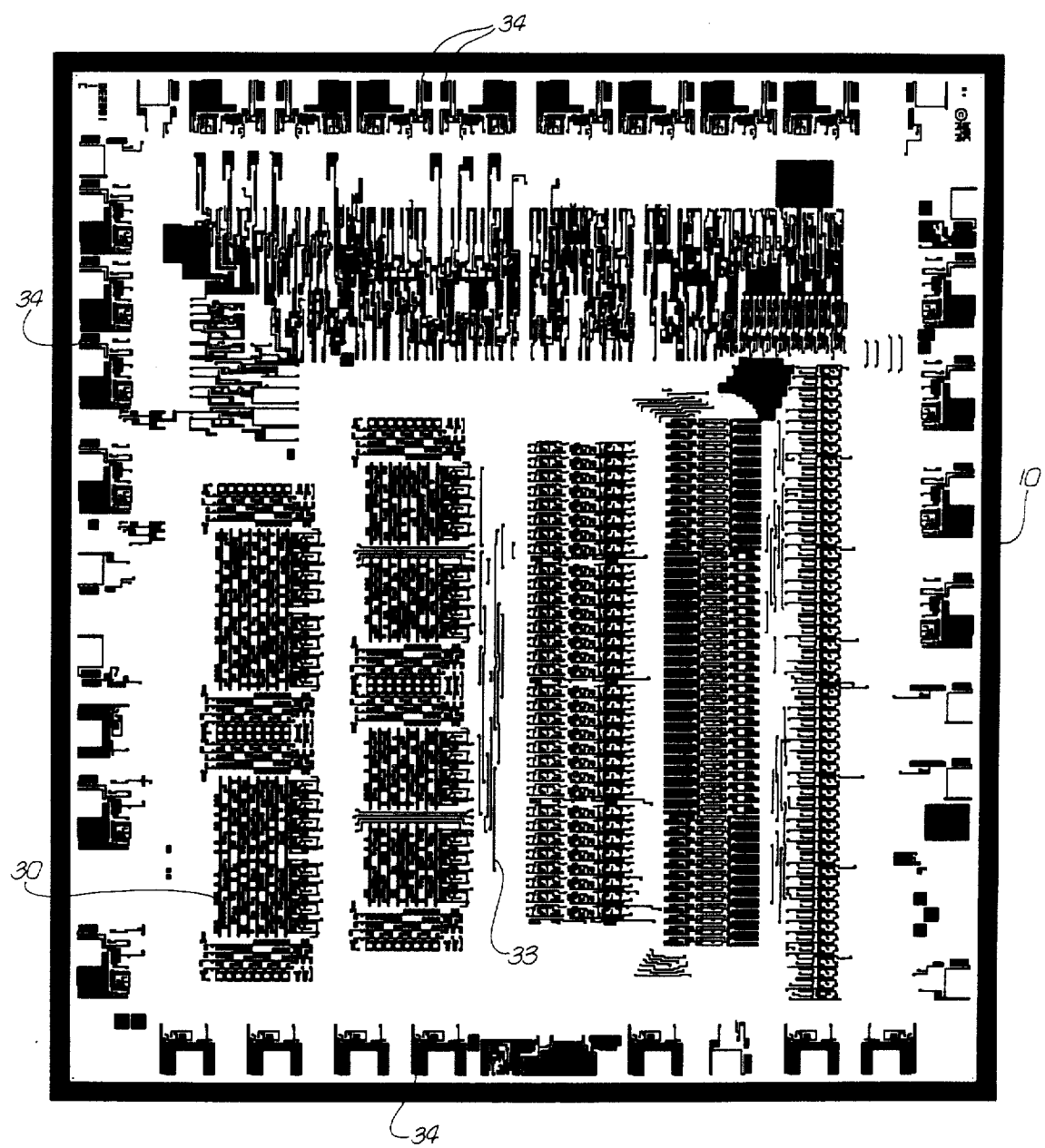
FIG. 2 is a scale drawing of a photomask utilized to pattern the substrate layer in which the source-drain and interconnect diffusion is subsequently formed in the manufacture of a MOS DES circuit according to the invention.

Referring now to FIG. 2, there is shown a drawing of the source-drain definition mask 10 utilized in manufacturing the preferred embodiment of the invention by means of the well-known N-channel self-aligned silicon gate MOS manufacturing process. The pattern of dark regions on the chip, such as area 30, designate areas where the source, drain, and channel regions of the MOS field effect transistors (FET's) comprising the DES chip circuitry are to be subsequently formed. The long, slender lines, such as area 33, designate areas where diffused conductors are to be subsequently formed. Also shown are the source-drain definition patterns 34 for a portion of the circuitry required for the interface control circuitry, the cypher data port, and the data access lines.

Figure 3:
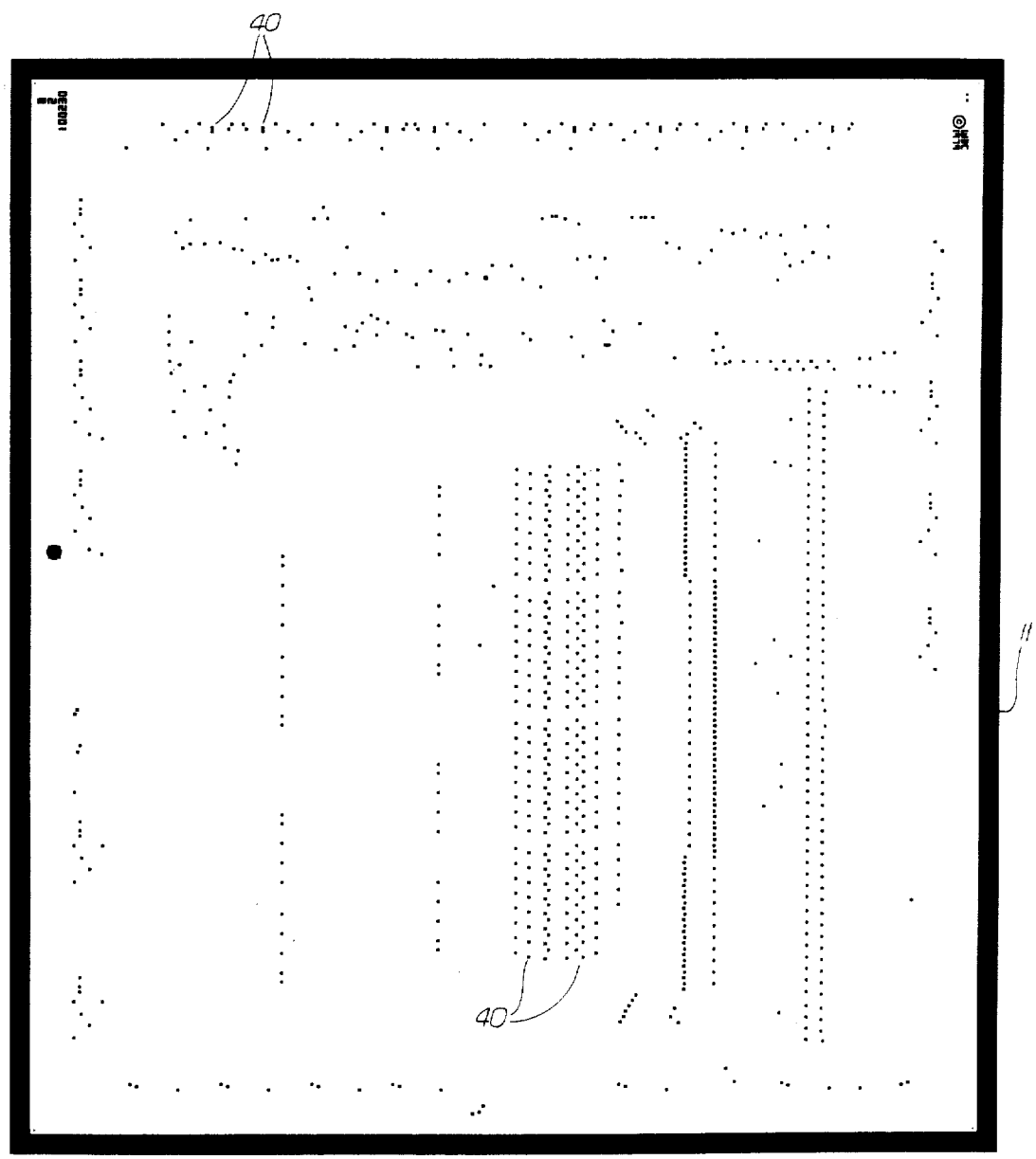
FIG. 3 is a scale drawing of a polycrystalline silicon-to-diffusion layer contact formation mask used in the manufacture of a MOS DES circuit according to the invention.

The source-drain definition mask 10 is used to etch a pattern in the field oxide grown on a P-type substrate which forms the basic structure of the entire DES chip. After the field oxide is patterned using the source-drain definition mask 10, a thin gate oxide is grown over the entire chip area. This thin gate oxide is then patterned by the diffusion contact mask 11 illustrated in FIG. 3. The dark areas, such as 40, of the diffusion contact mask 11 indicate where polycrystalline silicon-to-diffused region contacts are to be made. After these contact holes are formed in a conventional manner, polycrystalline silicon is deposited over the entire chip structure. The polycrystalline silcon is then patterned using the polymask 12 shown in FIG. 4, which defines the gate electrodes of the FET's that form the active devices comprising the DES chip circuitry, and also defines polycrystalline interconnection lines. For example, the long, thin lines 41 are polycrystalline conductors utilized as interconnectors, and do not act as FET gate electrodes. The dark regions, such as 42, represent FET gate electrodes.

Figure 5:
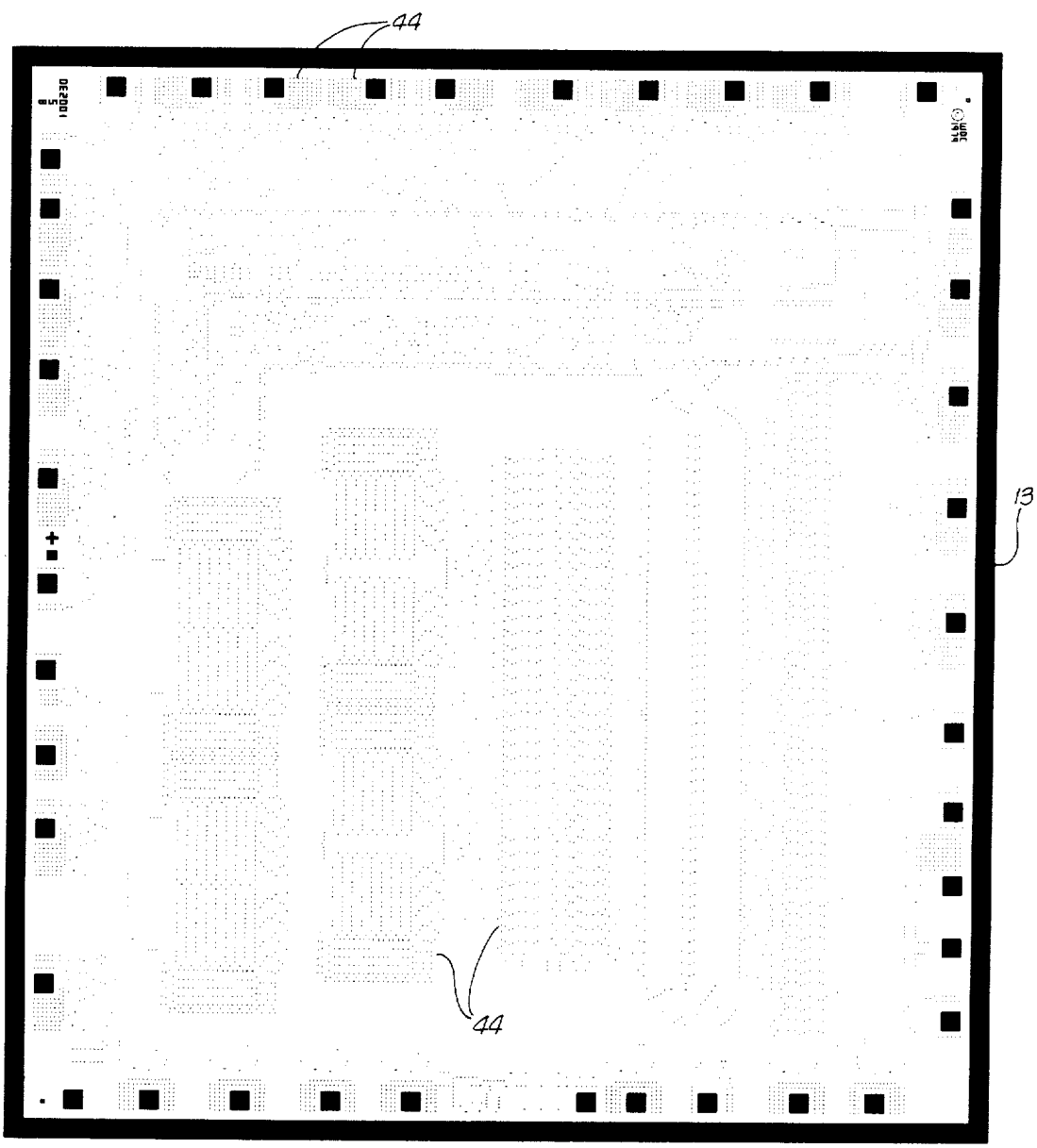
FIG. 5 is a scale drawing of a photomask used to pattern the preohmic contacts for connection of a metallized layer to the polycrystalline silicon layer and to the source-drain diffusion layer during the manufacture of a MOS DES circuit according to the invention.

After the DES chip is patterned with the polymask 12, the entire chip is diffused with N+ material in a conventional manner to complete the formation of the self-aligned silicon gate FET's. Thereafter, silicon oxide is deposited over the entire chip to act as an insulating protective layer. The silicon oxide coating is then etched with the preohmic mask 13 shown in FIG. 5. The dark areas, such as 44, define contact points between the metal covering to be subsequently applied and the previously formed polycrystalline silicon conductors and diffusion layer conductors.

Figure 6:
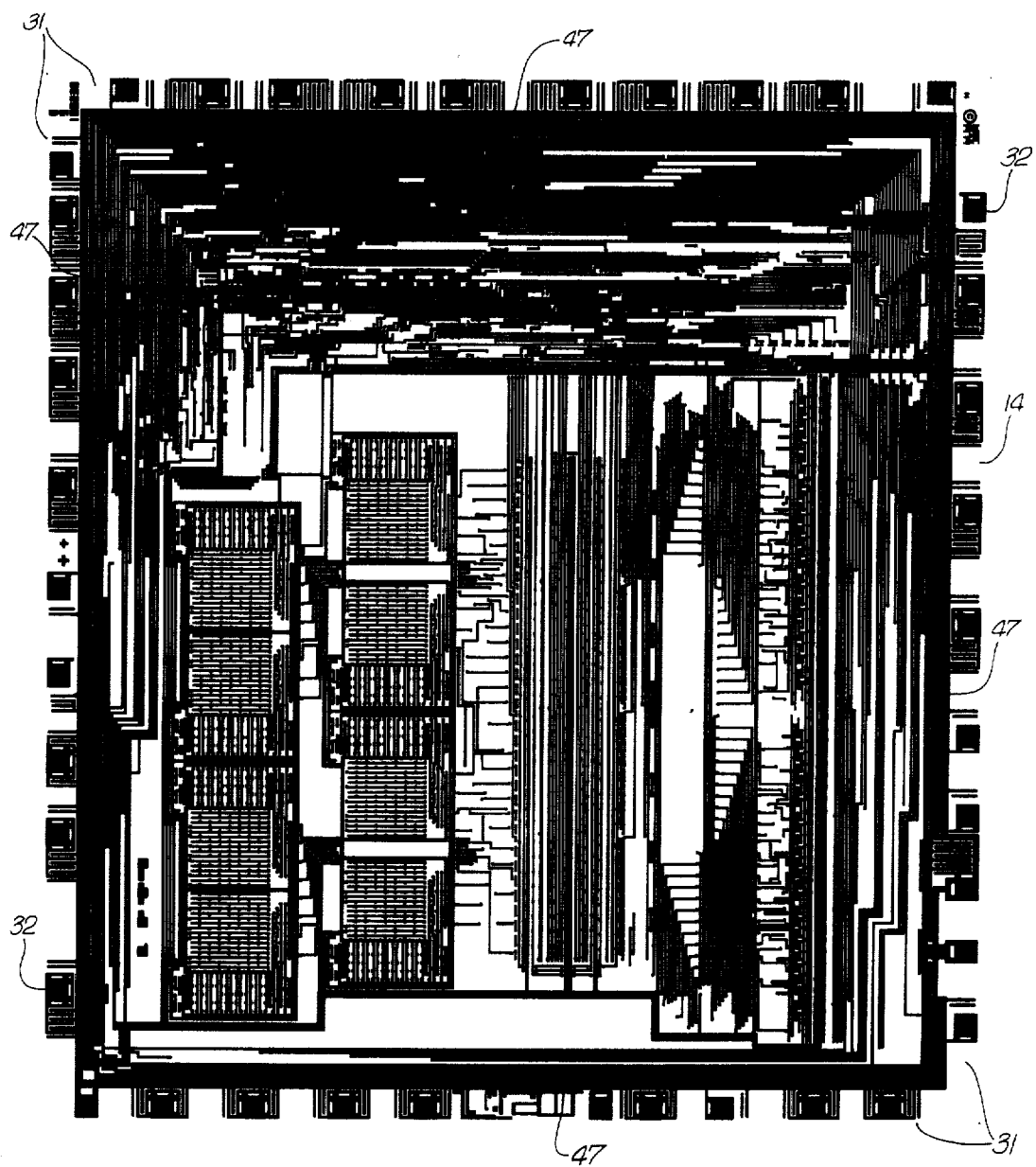
FIG. 6 is a scale drawing of a photomask used to pattern the metal interconnection layer of a MOS DES circuit according to the invention.

After etching the DES chip with the preohmic mask 13, the entire chip is coated with a metallic layer, which is then patterned by conventional etching techniques with the metal interconnect mask 14 shown in FIG. 6. The pattern of the metal interconnect mask 14 defines the final level of device interconnection on the DES chip.

As a last step, the protection mask 15 disclosed in FIG. 7 is used to define all the areas on the DES chip that are not to be coated with a protective oxide coating. The bonding pad areas 32 of the chip are masked off by the protection mask 15 so that they will not be covered with the protective coating, thereby ensuring that the bonding properties of the pad area 32 remain unaffected. Also masked off from the subsequently applied protective coating are four test points 48, used for probes during the production and testing of the DES chip.

The information disclosed by FIGS. 2 through 7 illustrates the geometry and interconnections of all the MOS FET's comprising the Data Encryption Standard circuit described as the preferred embodiment herein. It will be noted in reviewing FIGS. 2 through 7, but in particular FIG. 2, that many of the mask patterns forming the MOS FET's and their interconnections are highly symmetric. This symmetry is due primarily to the use of a repetitive cell structure in the design of this LSI chip, which is an important consideration because of the considerable savings in layout time achieved by use of such cells. Further, there is a substantially reduced probability of artwork error when repetitive cells are used instead of utilizing a custom approach to the artwork of each cell. On the other hand, use of standard cells for all of the logic on a MOS LSI chip is very unlikely to optimally utilize the chip area. However, creative use of some repetitive cells in combination with custom artwork for other sections of the chip may provide an optimum topology which will make possible a high chip yield from each substrate wafer, provide for good circuit electrical performance, and require a minimal amount of silicon substrate.

Figure 2A:
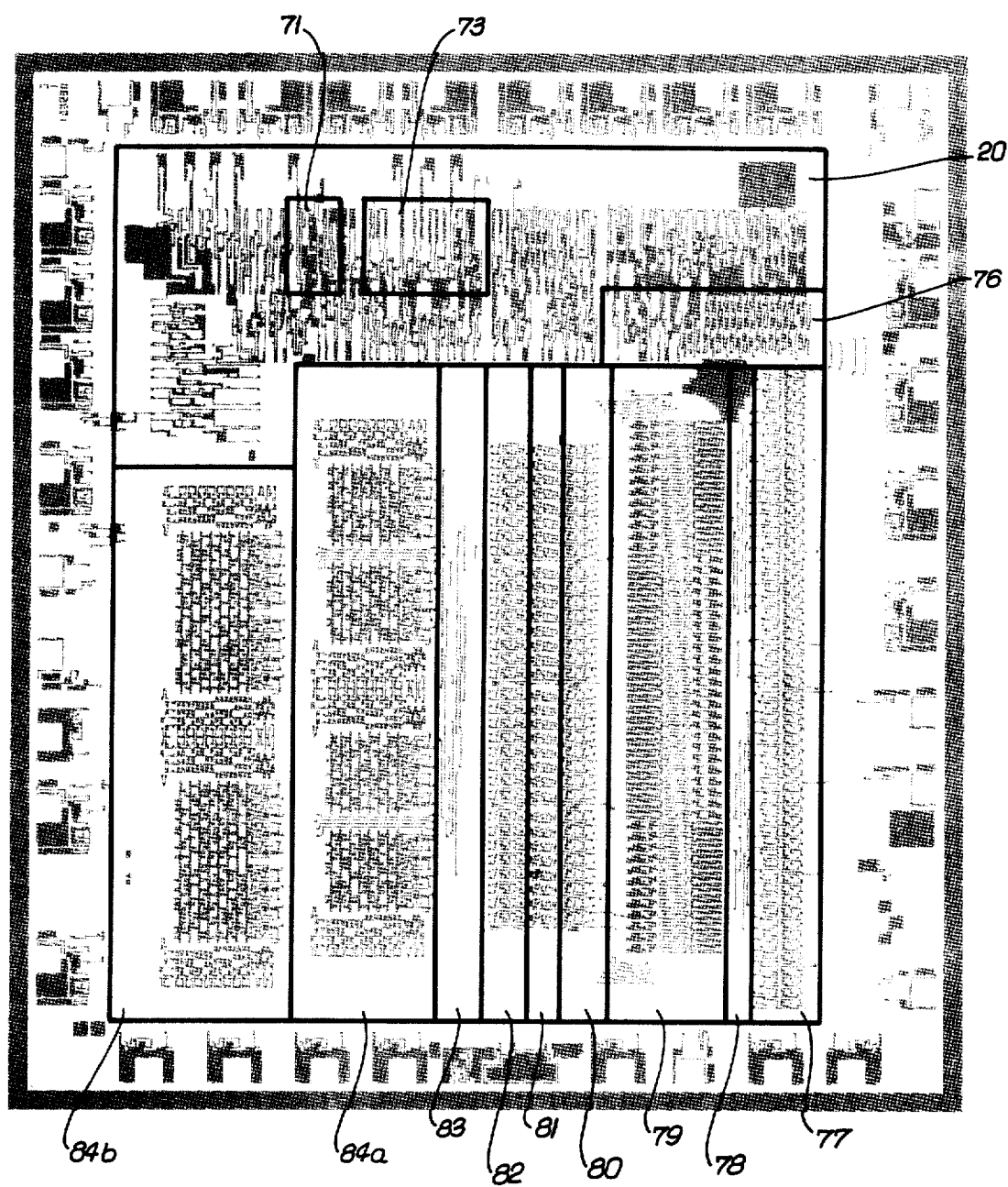
FIG. 2a is a scale drawing identical to FIG. 2, except that some of the sections illustrated in FIG. 2 are blocked out with heavy lines.

For example, in the key register 77 shown in FIG. 2a (which is identical to FIG. 2 with the outlines of FIG. 1 overlayed) fifty-six data cells are arranged in eight groups of seven cells. Six of the seven cells in each group are identical, and each group of seven cells is identical to each of the other groups. The two data registers 80, 82, each thirty-two bits wide, are similarly comprised of repetitive data cells.

As a further example of creative chip layout and circuit design, in the preferred embodiment of the DES chip, the key and data circuitry 76 allows the individual data cells of both the key register 77 and the two data registers 80, 82 to be reduced in size by approximately 60% from a conventional design. The key and data circuit 76 in effect boosts the transfer gate voltage for each data cell, which in accordance with well-known MOS FET characteristics allows a smaller data cell design. Thus, the present invention, by using some extra chip area for the key and data circuitry 76, significantly reduces the chip area required by the key register 77 and the two data reigsters 80, 82.

Figure 4:
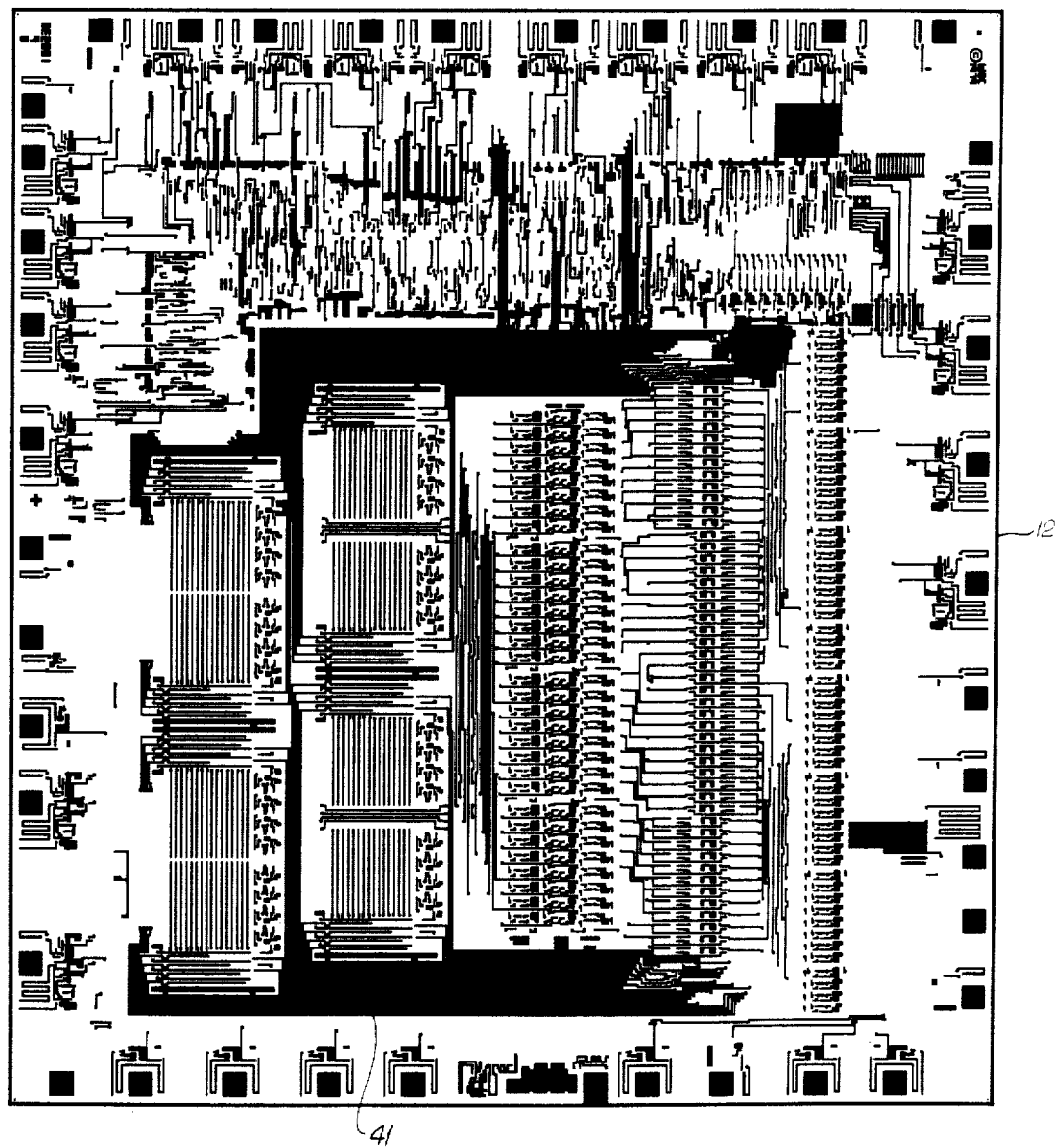
FIG. 4 is a scale drawing of a photomask used to pattern the polycrystalline silicon layer of a MOS DES circuit according to the invention.

It will be noted by reference to FIG. 4 that a large number of polycrystalline silicon conductors were employed it interconnecting the various portions of the DES chip. Polycrystalline silicon conductors were chosen because of the large number of conductors required and because, for the self-aligned silicon gate manufacturing process utilized, polycrystalline silicon conductors are narrower and have narrower center-to-center spacings then metal conductors, and have less capacitance than diffused conductors.

Once the chip architect selects the direction of a plurality of polycrystalline silicon conductors of substantial length, for reasons such as those listed above, it is largely settled that diffused conductors, where they are used, must be substantially parallel to the polycrystalline silicon conductors, as must any other polycrystalline silicon conductors, since neither polycrystalline silicon conductors nor diffused conductors can cross other polycrystalline silicon conductors. In the present embodiment, the selection of polycrystalline silicon for a large number of the conductors also establishes that many metal conductors have to be formed essentially perpendicular to the polycrystalline silicon conductors, as a comparison of the polymask 12 of FIG. 4 with the metal interconnect mask 14 of FIG. 6 shows. The direction of the metal conductors is mandated in order to physically interconnect diverse portions of the chip circuitry, and also to avoid the formation of metal lines parallel to polycrystalline silicon conductors for long lengths which creates undesirable capacitances.

With reference to FIG. 6, it can be seen also that metallic conductors 47 are formed around the periphery 31 of the DES chip, coupling the internal circuitry of the chip to the bonding pads 32, either directly or through polycrystalline silicon or diffusion conductors.

A very high level of creativity is required of the chip architect in designing MOS LSI random logic chips such as are used in microprocessor or data encryption chips and the like because of the layout constraints for state-of-the-art manufacturing processes. For example, for self-aligned silicon gate MOS manufacturing processes, the major constraints are the minimum width and spacings of the diffused regions, the minimum size required for preohmic openings and the spacings required from the edge of the peripheral preohmic openings to the edge of the diffused regions, the minimum width and spacing of polycrystalline silicon lines and the fact that such lines cannot cross over diffused regions, the minimum width and spacing between metal lines, and of course the fact that conductors in the same layer or in uninsulated adjacent layers cannot cross like conductors. The high amount of capacitance associated with diffused regions and the resistance of both diffused lines and polycrystalline silicon lines (and to a lesser extent of metal lines) provide further constraints on the chip architect. For logic circuits which may be characterized as random logic designs, such as that of the subject invention, a large number of interconnection lines between sections of logic circuitry are required and the very large number of possibilities for routing the various kinds of conductors to the various required sections of the chip taxes the ingenuity of the most competent chip topology architect and the capacity of the most sophisticated computer routing programming available. Computer aided design (CAD) has been applied to computerize random logic MOS LSI layouts for a number of years. However, it has been successful only to the extent that it provides rapid prototype circuit designs having rather mediocre performance and producing uneconomically large semiconductor chips. It is well established that the CAD programs currently available do not come close to matching human ingenuity in providing MOS LSI chip architectures or minimized logic designs which provide optimum performance while utilizing minimal substrate area. The exercise of a high level of creativity in the design of MOS LSI chips thus results in economic reward of substantial measure.

While the invention has been described with reference to several embodiments thereof, those skilled in the art will recognize that changes in form and placement of parts may be made to suit various requirements within the scope of the invention.

What is claimed is:

1. A metal-oxide-semiconductor (MOS) chip for a Data Encryption Standard (DES) circuit implementing a pre-selected data encryption algorithm, comprising:
   (a) control circuitry adapted to be coupled to external circuitry by means of external signal lines presenting signals to and receiving signals from said external circuitry, for regulating the function of said DES circuit;
   (b) a key register coupled to said control circuitry, for storing a user-supplied keyword;
   (c) permuted choice circuitry coupled to said key register;
   (d) first combinatorial circuitry coupled to said permuted choice circuitry;
   (e) a right data register coupled to said first combinatorial circuitry and to said control circuitry, for storing data to be encrypted or decrypted;
   (f) second combinatorial circuitry coupled to said right data register;
   (g) a left data register coupled to said second combinatorial circuitry, to said right data register, and to said control circuitry, for storing data to be encrypted or decrypted;
   (h) P-combinatorial circuitry coupled to said second combinatorial circuitry;
   (i) a first programmable logic array group coupled to said first combinatorial circuitry and to said P-combinatorial circuitry; and
   (j) a second programmable logic array group coupled to said first combinatorial circuitry, to said P-combinatorial circuitry, and to said first programmable logic array group;

wherein substantially all of said control circuitry is disposed within a substantially rectangular control circuitry area on the surface of said MOS chip; and wherein said key register, permuted choice circuitry, first combinatorial circuitry, right data register, second combinatorial circuitry, left data register, P-combinatorial circuitry, first programmable logic array group, and second programmable logic array group occupy, respectively, rectangular areas disposed parallel to each other on the surface of said MOS chip, said rectangular areas each being perpendicular to and having one side adjacent to said control circuitry area.

2. A metal-oxide-semiconductor (MOS) chip for a Data Encryption Standard (DES) circuit implementing a pre-selected data encryption algorithm, comprising:

(a) an input/output bus;

(b) a key register coupled to said input/output bus, for storing a user-supplied keyword;

(c) permuted choice circuitry coupled to said key register;

(d) first combinatorial circuitry coupled to said permuted choice circuitry;

(e) a right data register coupled to said first combinatorial circuitry and to said input/output bus, for storing data to be encrypted or decrypted;

(f) second combinatorial circuitry coupled to said right data register;

(g) a left data register coupled to said second combinatorial circuitry, to said right data register, and to said input/output bus, for storing data to be encrypted or decrypted;

(h) P-combinatorial circuitry coupled to said second combinatorial circuitry;

(i) a first programmable logic array group coupled to said first combinatorial circuitry and to said P-combinatorial circuitry;

(j) a second programmable logic array group coupled to said first combinatorial circuitry, to said P-combinatorial circuitry, and to said first programmable logic array group;

(k) data access lines coupled to said input/output bus, and adapted to be coupled to external circuitry by means of a first external bi-directional data bus presenting data to and receiving data from said external circuitry;

(l) a control register coupled to said input/output bus, for storing user-supplied control commands and status information generated by said DES circuit;

(m) master control logic circuitry coupled to said control register, for regulating the overall function of said DES circuit;

(n) parity detect circuitry coupled to said input/output bus and to said master control logic circuitry, for detecting errors in each keyword supplied by a user;

(o) interface control circuitry coupled to said master control logic circuitry and adapted to be coupled to external circuitry, for receiving and transmitting signals between said DES circuit and said external circuitry;

(p) a cipher data port coupled to said input/output bus and adapted to be coupled to external circuitry by means of a second external bi-directional data bus presenting data to and receiving data from external circuitry;

(q) buffer control circuitry coupled to said data access lines, said cipher data port, and said master control logic circuitry, for regulating the flow of data into and out of said data access lines and said cipher data port under the control of said master control logic circuitry; and (r) key and data control circuitry coupled to said control register, said master control logic circuitry, said key register, said right data register data, and said left data register, for regulating the transfer of data into and out of said key register, said left data register, and said right data register, under the control of said master control logic circuitry and said control register;

wherein said data access lines, said cipher data port, and substantially all of said interface control circuitry are disposed around the periphery of the surface of said MOS chip and form the perimeter of a rectangular inner circuit area on the surface of said MOS chip;

wherein said master control logic circuitry, buffer control circuitry, control register, key and data control circuitry, parity detect circuitry, and the remainder of said interface control circuitry are disposed within a substantially rectangular control circuitry area arranged within, and spanning one side of, said inner circuit area; and wherein said key register, permuted choice circuitry, first combinatorial circuitry, right data register, second combinatorial circuitry, left data register, P-combinatorial circuitry, first programmable logic array group, and second programmable logic array group occupy, respectively, rectangular areas disposed parallel to each other, said rectangular areas each being perpendicular to and having one side adjacent to said control circuitry area, and each being within said inner circuit area.

3. A MOS DES chip circuit as recited in claim 1 or claim 2 housed in a dual-in-line semiconductor package wherein the voltage supply pins $V_{cc}$, $V_{dd}$, and $V_{ss}$ are not symmetrically arranged around the perimeter of said semiconductor package in order to prevent damage to said MOS DES circuit if said semiconductor package is improperly inserted into a printed circuit board.

4. The MOS DES circuit chip as recited in claim 3 wherein the circuitry of said chip is N-channel self-aligned silicon gate circuitry.

5. The MOS DES circuit chip as recited in claim 3 configured to be selectively packaged in either a 28-pin dual-in-line semiconductor package or a 40-pin dual-in-line semiconductor package.

6. A metal-oxide semiconductor (MOS) chip for a Data Encryption Standard (DES) circuit comprising data access lines, buffer control circuitry, a cipher data port, parity detect circuitry, master control logic circuitry, a control register, key and data control circuitry, a key register, permuted choice circuitry, a first combinatorial circuit, a right data register, a second combinatorial circuit, a left data register, a P-combinatorial circuit, a first programmable logic array group, a second programmable logic array group, and interface control circuitry coupled to a multiplicity of bonding pads on a surface of said MOS DES chip, said bonding pads being arranged around the periphery of said MOS DES chip in a sequence counter-clockwise from a system clock bonding pad CLK, said CLK bonding pad being located at the top of a first edge of said chip and coupled to said interface control circuitry, said bonding pads including, respectively, a multiplicity of cipher data port bonding pads CDP1, CDP3, CDP5, CDP7 coupled to said cipher data port; a $\overline{\text{Read Enable}}$ bonding pad $\overline{\text{RE}}$ and a $\overline{\text{Write Enable}}$ bonding pad $\overline{\text{WE}}$ coupled to said interface control circuitry; a first voltage supply bonding pad $V_{dd}$ and a second voltage supply bonding pad $V_{cc}$ coupled to said MOS DES circuit; a first no-connection bonding pad NC1; a $\overline{\text{Dataut/ Acknowledge}}$ bonding pad $\overline{\text{DOA}}$ and a $\overline{\text{Datan/ Acknowledge}}$ bonding pad $\overline{\text{DIA}}$ coupled to said interface control circuitry; a second no-connection bonding pad NC2; a $\overline{\text{Key Ac}}$ $\overline{\text{knowledge}}$ bonding pad $\overline{\text{KA}}$ coupled to said interface control circuitry; a third no-connection pad NC3; a Data-Out Request bonding pad DOR, a Data-In Request bonding pad DIR, a Key Request bonding pad KR, and a Key Error Output Enable bonding pad KEOE coupled to said interface control circuitry; a third voltage supply bonding pad $V_{ss}$ coupled to said MOS DES circuit; an $\overline{\text{Encrypt/Decrypt}}$ bonding pad $\overline{\text{E/D}}$, an Activate bonding pad ACT, a $\overline{\text{Key Parity Error}}$ Bonding pad $\overline{\text{KPE}}$, a $\overline{\text{Master Reset}}$ bonding pad $\overline{\text{MR}}$, and a $\overline{\text{Command Register Pin Select}}$ bonding pad $\overline{\text{CRPS}}$ coupled to said interface control circuitry; a multiplicity of cipher data port bonding pads CDP0, CDP2, CDP4, CDP6 coupled to said cipher data port; an A0 bonding pad and a $\overline{\text{Data Port Select}}$ bonding pad $\overline{\text{DPS}}$ coupled to said interface control circuitry; a multiplicity of data access line bonding pads DAL6, DAL4, DAL2, DAL0, DAL7, DAL5, DAL3, DAL1 coupled to said data access lines; and a $\overline{\text{Chip Select}}$ bonding pad $\overline{\text{CS}}$ coupled to said interface control circuitry.

7. The MOS DES circuit chip as recited in claim 6 configured to be selectively packaged in either a 28-pin dual-in-line semiconductor package or a 40-pin dual-in-line semiconductor package.

* * * * *